(12) United States Patent
Wick et al.

(10) Patent No.: US 9,779,085 B2
(45) Date of Patent: Oct. 3, 2017

(54) MULTILINGUAL EMBEDDINGS FOR NATURAL LANGUAGE PROCESSING

(71) Applicant: Oracle International Corporation, Redwood Shores, CA (US)

(72) Inventors: Michael Louis Wick, Medford, MA (US); Pallika Haridas Kanani, Westford, MA (US); Adam Craig Pocock, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 201 days.

(21) Appl. No.: 14/863,996

(22) Filed: Sep. 24, 2015

(65) Prior Publication Data

US 2016/0350288 A1    Dec. 1, 2016

Related U.S. Application Data

(60) Provisional application No. 62/168,235, filed on May 29, 2015.

(51) Int. Cl.
*G06F 17/28* (2006.01)
*G06F 17/27* (2006.01)
*G10L 25/00* (2013.01)

(52) U.S. Cl.
CPC ...... *G06F 17/2818* (2013.01); *G06F 17/2735* (2013.01)

(58) Field of Classification Search
CPC ............. G06F 17/2818; G06F 17/2735; G06F 17/2827; G06F 17/289; G06F 17/2836
USPC ...................... 704/2, 8, 9, 10, 203, 269, 277
See application file for complete search history.

(56) References Cited

U.S. PATENT DOCUMENTS 9,037,464 B1    5/2015    Mikolov et al.

OTHER PUBLICATIONS

S. Chandar et al.; "An Autoencoder Approach to Learning Bilingual Word Representations"; arXiv:1402.1454v1 [cs.CL] Feb. 6, 2014.
(Continued)

*Primary Examiner* — Thierry L Pham
(74) *Attorney, Agent, or Firm* — Miles & Stockbridge P.C.

(57) ABSTRACT

A natural language processing ("NLP") manager is provided that manages NLP model training. An unlabeled corpus of multilingual documents is provided that span a plurality of target languages. A multilingual embedding is trained on the corpus of multilingual documents as input training data, the multilingual embedding being generalized across the target languages by modifying the input training data and/or transforming multilingual dictionaries into constraints in an underlying optimization problem. An NLP model is trained on training data for a first language of the target languages, using word embeddings of the trained multilingual embedding as features. The trained NLP model is applied for data from a second of the target languages, the first and second languages being different.

20 Claims, 8 Drawing Sheets

(56) References Cited

OTHER PUBLICATIONS

K. Hermann et al.; "Multilingual Distributed Representations without Word Alignment"; arXiv:1312.6173v4 [cs.CL] Mar. 20, 2014.
A. Klementiev et al.; "Inducing Crosslingual Distributed Representations of Word"; 2012.
Y. Bengio et al.; "A Neural Probabilistic Language Model"; Journal of Machine Learning Research 3 (2003) 1137-1155; published Feb. 2003.
T. Mikolov et al.; "Efficient Estimation of Wrod Representations in Vector Space"; arXiv:130.3781v3 [cs.CL] Sep. 7, 2013.

| Language | WP Docs (x10⁶) | #ΩW Concepts | Sentiment Train | Sentiment Test | % MicroBlog |
|---|---|---|---|---|---|
| English (en) | 4.87 | 8821 | 24960 | 6393 | 36 |
| French (fr) | 1.62 | 7408 | 14284 | 3081 | 36 |
| German (de) | 1.82 | 8258 | 12247 | 2596 | 25.5 |
| Spanish (es) | 1.18 | 6501 | 16506 | 59529 | 84.7 |
| Bokmål (no) | 0.411 | 5336 | 1225 | 1000 | 0 |

| Method | Word-pair cos. | En W. Analogy | Fr W. Analogy | Mixed En+Fr W. Analogy |
|---|---|---|---|---|
| no const | 0.286 | 77.5% | 47.8% | 39.3% |
| with const | 0.422 | 52.8 | 40.4 | 43.6 |
| ACS | 0.439 | 66.9 | 53.3 | 52.6 |
| Monolingual | -0.015 | 81.1 | 45.2 | NA |

Fig. 8

|       |      |           | Bilingual |          |       |       | Multilingual |          |       |       |
|-------|------|-----------|-----------|----------|-------|-------|--------------|----------|-------|-------|
| Train | Test | Model     | TwAFrac   | TotAFrac | TwA   | TotA  | TwAFrac      | TotAFrac | TwA   | TotA  |
| fr    | fr   | None      |           |          | 0.699 | 0.749 |              |          | 0.699 | 0.749 |
| en    | fr   | None      | 0.531     | 0.573    | 0.371 | 0.43  | 0.531        | 0.573    | 0.371 | 0.43  |
| en    | fr   | No Const  | 0.77      | 0.646    | 0.538 | 0.484 | 0.79         | 0.678    | 0.552 | 0.508 |
| en    | fr   | With Const| 0.731     | 0.659    | 0.511 | 0.494 | 0.784        | 0.714    | 0.548 | 0.535 |
| en    | fr   | ACS       | 0.84      | 0.674    | 0.587 | 0.505 | 0.805        | 0.651    | 0.562 | 0.488 |
| es    | es   | None      |           |          | 0.644 | 0.642 |              |          | 0.644 | 0.642 |
| en    | es   | None      | 0.593     | 0.604    | 0.382 | 0.387 | 0.593        | 0.604    | 0.382 | 0.387 |
| en    | es   | No Const  | 0.652     | 0.754    | 0.42  | 0.484 | 0.774        | 0.691    | 0.499 | 0.443 |
| en    | es   | With Const| 0.815     | 0.79     | 0.525 | 0.507 | 0.714        | 0.678    | 0.46  | 0.435 |
| en    | es   | ACS       | 0.783     | 0.855    | 0.505 | 0.549 | 0.765        | 0.784    | 0.493 | 0.503 |
| de    | de   | None      |           |          | 0.702 | 0.749 |              |          | 0.702 | 0.749 |
| en    | de   | None      | 0.685     | 0.633    | 0.481 | 0.474 | 0.685        | 0.633    | 0.481 | 0.474 |
| en    | de   | No Const  | 0.779     | 0.585    | 0.547 | 0.438 | 0.809        | 0.627    | 0.568 | 0.47  |
| en    | de   | With Const| 0.805     | 0.642    | 0.565 | 0.481 | 0.762        | 0.688    | 0.535 | 0.515 |
| en    | de   | ACS       | 0.854     | 0.747    | 0.599 | 0.56  | 0.795        | 0.667    | 0.559 | 0.499 |
| no    | no   | None      |           |          | -     | 0.729 |              |          | -     | 0.729 |
| en    | no   | None      | -         | 0.879    | -     | 0.641 | -            | 0.879    | -     | 0.641 |
| en    | no   | No Const  | -         | 0.896    | -     | 0.653 | -            | 0.944    | -     | 0.688 |
| en    | no   | With Const| -         | 0.936    | -     | 0.682 | -            | 0.89     | -     | 0.649 |
| en    | no   | ACS       | -         | 0.896    | -     | 0.653 | -            | 0.888    | -     | 0.647 |
| en    | en   | None      |           |          | 0.638 | 0.684 |              |          | 0.638 | 0.684 |
| fr    | en   | None      | 0.616     | 0.482    | 0.393 | 0.33  | 0.616        | 0.482    | 0.393 | 0.33  |
| fr    | en   | No Const  | 0.81      | 0.582    | 0.517 | 0.398 | 0.665        | 0.576    | 0.424 | 0.394 |
| fr    | en   | With Const| 0.825     | 0.647    | 0.526 | 0.443 | 0.816        | 0.717    | 0.52  | 0.491 |
| fr    | en   | ACS       | 0.843     | 0.64     | 0.538 | 0.438 | 0.816        | 0.692    | 0.52  | 0.474 |

Fig. 9

MULTILINGUAL EMBEDDINGS FOR NATURAL LANGUAGE PROCESSING

CROSS-REFERENCE TO RELATED APPLICATIONS

The present application claims the benefit of U.S. Provisional Application No. 62/168,235, filed May 29, 2015, which is hereby incorporated by reference in its entirety.

FIELD

One embodiment is directed generally to a computer system, and in particular to a computer system that performs natural language processing tasks.

BACKGROUND INFORMATION

An important practical problem in natural language processing ("NLP") is to make NLP tools (e.g., named entity recognition, parsers, sentiment analysis) available in every language. Many of the resources available in a language such as English are not available in languages with fewer speakers. One solution is to collect training data in every language for every task for every domain, but such data collection is expensive and time consuming.

SUMMARY

One embodiment is a system that manages NLP model training. An unlabeled corpus of multilingual documents is provided that span a plurality of target languages. The system trains a multilingual embedding on the corpus of multilingual documents as input training data. The system generalizes the multilingual embedding across the target languages by modifying the input training data and/or transforming multilingual dictionaries into constraints in an underlying optimization problem. The system trains an NLP model on training data for a first language of the target languages, using word embeddings of the trained multilingual embedding as features. The system applies the trained NLP model on data from a second of the target languages, the first and second languages being different.

DETAILED DESCRIPTION

According to an embodiment, a system is provided that trains a natural language processing ("NLP") model in one language and applies that NLP model to a different language. The system can use large collections of unlabeled multilingual data to find a common representation in which structure is shared across languages. Under such representations, the system can train an NLP model in a language with many resources and generalize that model to work on lower resource languages. Thus, such multilingual word embeddings can substantially reduce the cost and effort required in developing cross-lingual NLP tools.

Figure 1:
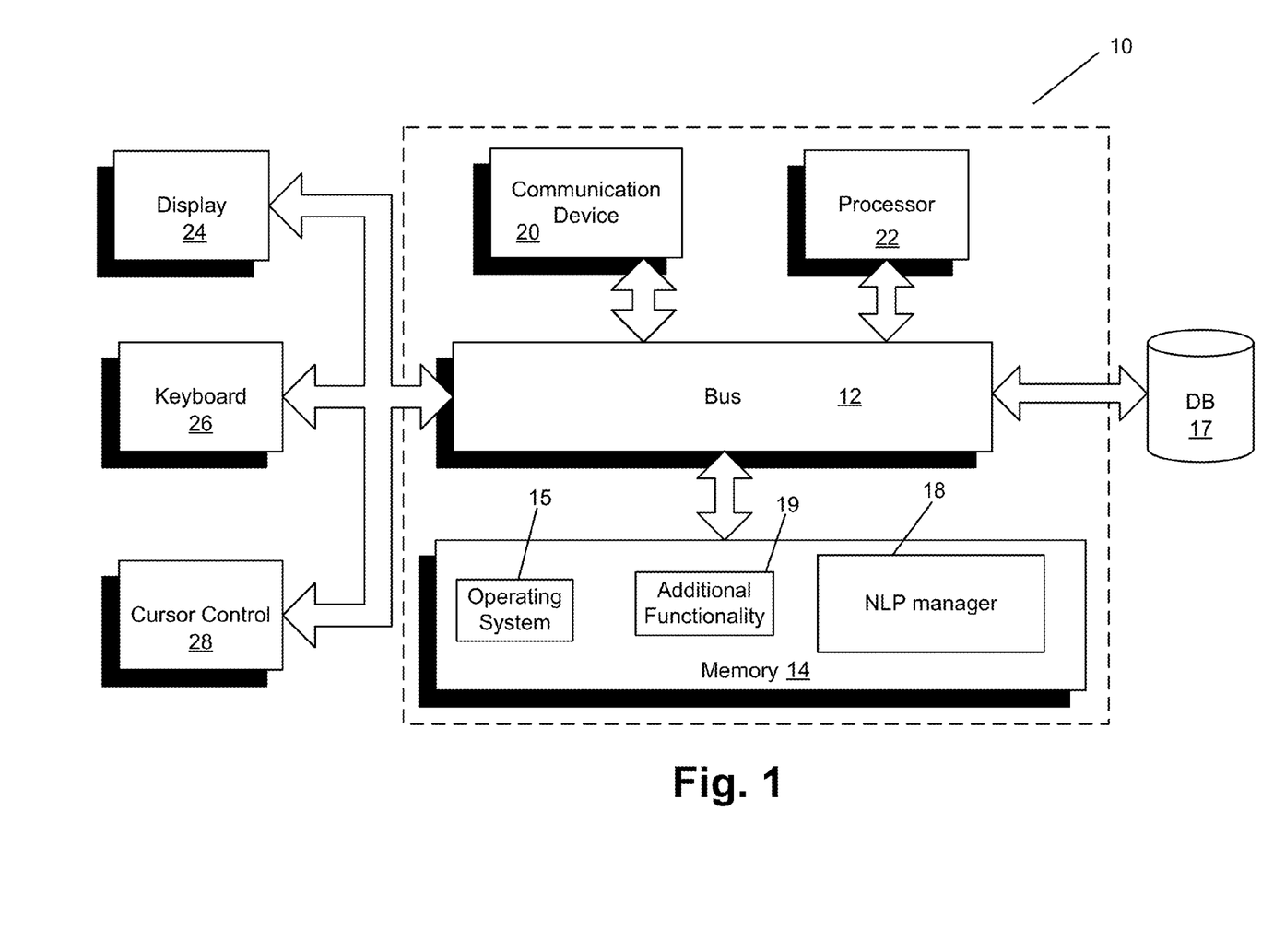
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include an NLP manager 18 that optimizes/manages NLP model training, as disclosed in more detail below. The modules further include one or more functional modules 19 that can include the additional functionality, such as modules for performing NLP tasks such as automatic summarization, coreference resolution, discourse analysis, machine translation, morphological segmentation, named entity recognition ("NER"), natural language generation, natural language understanding, optical character recognition ("OCR"), part-of-speech tagging, parsing, question answering, relationship extraction, sentence breaking (or sentence boundary disambiguation), sentiment analysis, speech recognition, speech segmentation, topic segmentation and recognition, word segmentation, word sense disambiguation, information retrieval ("IR"), information extraction ("IE"), speech processing (speech recognition, text-to-speech and related tasks), native language identification, stemming, text simplification, text-to-speech, text-proofing, natural language search, query expansion, automated essay scoring, truecasing, etc.

A database 17 is coupled to bus 12 to provide centralized storage for modules 18 and 19. Database 17 can store data in an integrated collection of logically-related records or files. Database 17 can be an operational database, an analytical database, a data warehouse, a distributed database, an end-user database, an external database, a navigational database, an in-memory database, a document-oriented database, a real-time database, a relational database, an object-oriented database, or any other database known in the art.

In one embodiment, system 10 is configured to train an NLP model in one language and apply that NLP model to a different language. System 10 can use large collections of unlabeled multilingual data to find a common representation in which structure is shared across languages. Under such representations, system 10 can train an NLP model in a language with many resources and generalize that model to work on lower resource languages. Thus, such multilingual word embeddings can substantially reduce the cost and effort required in developing cross-lingual NLP tools.

Word embedding is the collective name for a set of language modeling and feature learning techniques in natural language processing where words from the vocabulary (and possibly phrases thereof) are mapped to vectors of real numbers in a low dimensional space, relative to the vocabulary size ("continuous space"). Word embeddings map word-types to dense, low dimensional (e.g., 300) vectors, and are advantageous for NLP because they help cope with the sparsity problems associated with text. Using embeddings learned from monolingual text as features improves the accuracy of existing NLP models.

The basis for learning such embeddings is the distributional hypothesis of language, which stipulates that words are defined by their usage. Learning vector representations of words that are good at predicting their context words over intruder words captures a remarkable amount of syntactic and semantic structure. For example, vec("king")−vec("man")+vec("woman")≈vec("queen"). Of course it is expected that these results are not unique to English. A model trained on French, for example, would likely yield similar structure: vec("roi")−vec("homme")+vec("femme")≈vec("reine"). A potential problem with approaches that depend heavily upon the distributional hypothesis in multilingual environments is that they assume that words are defined by their context in a large corpus of text. While this may hold for words within a single language, it is unlikely to hold across languages because usually all the words in a context belong to the same language.

Figure 2A:
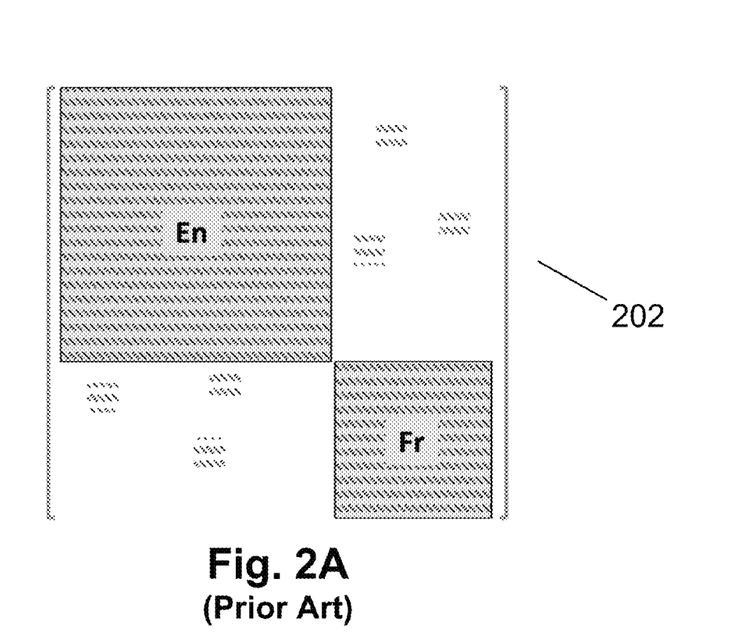
FIG. 2A illustrates a word to context-word co-occurrence matrix for a bilingual corpus (English and French) of prior art systems.

FIG. 2A illustrates a word to context-word co-occurrence matrix 202 for a bilingual corpus (English and French) of prior art systems. Visualizing the word to context-word co-occurrence statistics as matrix 202 reveals large blocks of connectivity for each language, with sparse scattering of non-zero cells elsewhere. This block structure causes problems as many word embedding techniques can be seen as performing matrix factorization on co-occurrence matrices.

However, some words are shared across languages: named entities such as "iPad" or "Obama," lexical borrowing of words from other languages, and code switching in which a multilingual speaker switches between languages during a dialogue. These phenomena may allow for a jointly trained embedding model to learn structure that generalizes across languages. If the languages are merged with a unified vocabulary and continuous bag-of-words model ("CBOW") is run on multilingual data, it learns multilingual analogies such as vec("roi")−vec("hombre")+vec("woman")≈vec("reina"). Thus, embeddings can be trained on a large corpus to learn a good multilingual embedding. Additionally or alternatively, the model or data can be transformed to more directly capture multilingual structure.

Embodiments can perform one or both of two approaches for improving multilingual embeddings via human provided dictionaries that translate a small subset of vocabulary words across multiple languages. In the first approach, the underlying embedding method is augmented with a set of constraints derived from the word translations. The constraints force dictionary words to have similar magnitudes and angles between them. In the second approach, the data is transformed using a process termed artificial code switching ("ACS"). This process employs the translation dictionaries to replace some of the words in the text with words from another language.

Figure 2B:
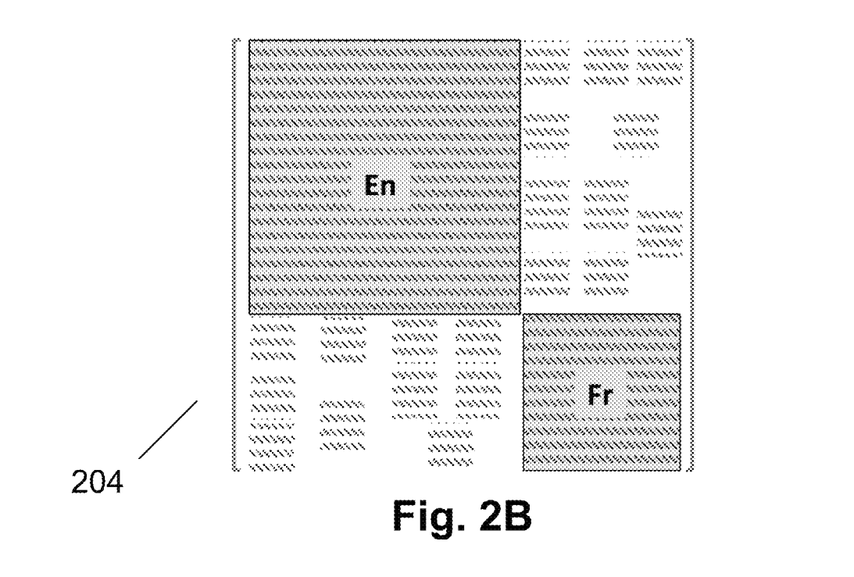
FIG. 2B illustrates a word to context-word co-occurrence matrix after artificial code-switching is applied, in accordance with an embodiment of the invention.

FIG. 2B illustrates a word to context-word co-occurrence matrix 204 after artificial code-switching is applied, in accordance with an embodiment of the invention. Matrix 202 shown in FIG. 2A is essentially block diagonal, but each block is fairly sparse as it represents the co-occurrence of words within the language. Effectively, the artificial code switching approach fills in more cells of co-occurrence matrix 204 making matrix 204 less block diagonal than bilingual co-occurrence matrix 202, and thus ripe for learning multilingual representations.

Embodiments improve the quality of multilingual embeddings over a system that relies upon natural cross lingual co-occurrences alone. Further, multilingual word analogy data demonstrates that combining multiple languages into a single space enables lower resource languages to benefit from the massive amount of data available in higher resource languages. It has been determined that ACS in particular learns the best multilingual word embeddings, achieving more than 50% accuracy on bilingual word analogies. The multilingual embeddings disclosed herein allow for embodiments to build sentiment models in languages without training data by training models on, for example, English, and using the embedding to generalize the information to other languages.

In one embodiment, system 10 can consume a large corpus of multilingual text and produce a single, unified word embedding in which the word vectors generalize across languages. System 10 is agnostic about the languages with which the documents in the corpus are expressed, and does not rely, as with known systems, on parallel corpora to constrain the spaces. Parallel corpora are large collections of parallel texts, each parallel text being a text placed alongside its translation or translations. Parallel corpora may be aligned at the sentence level which is a non-trivial task. For many languages, it may be difficult and/or too costly to acquire large parallel corpora. Instead, system 10 utilizes a small set of human provided word translations via one or both of two approaches. The first approach transforms these multilingual dictionaries into constraints in the underlying optimization problem. The second approach more directly exploits the distributional hypothesis via artificial code switching. As the name suggests, system 10 can induce code-switching so that words across multiple languages appear in contexts together. Not only do the models learn common cross-lingual structure, the common structure allows an NLP model trained in one language to be applied to another and achieve up to 80% of the accuracy of models trained on in-language data.

In some embodiments, system 10 combines many corpora from many languages into the same embedding space. System 10 can combine all such corpora into a single embedding space, and use this one embedding space to provide the features for all of the languages. System 10 can use a limited number of translated word pairs which can be extracted from dictionaries.

Figure 3:
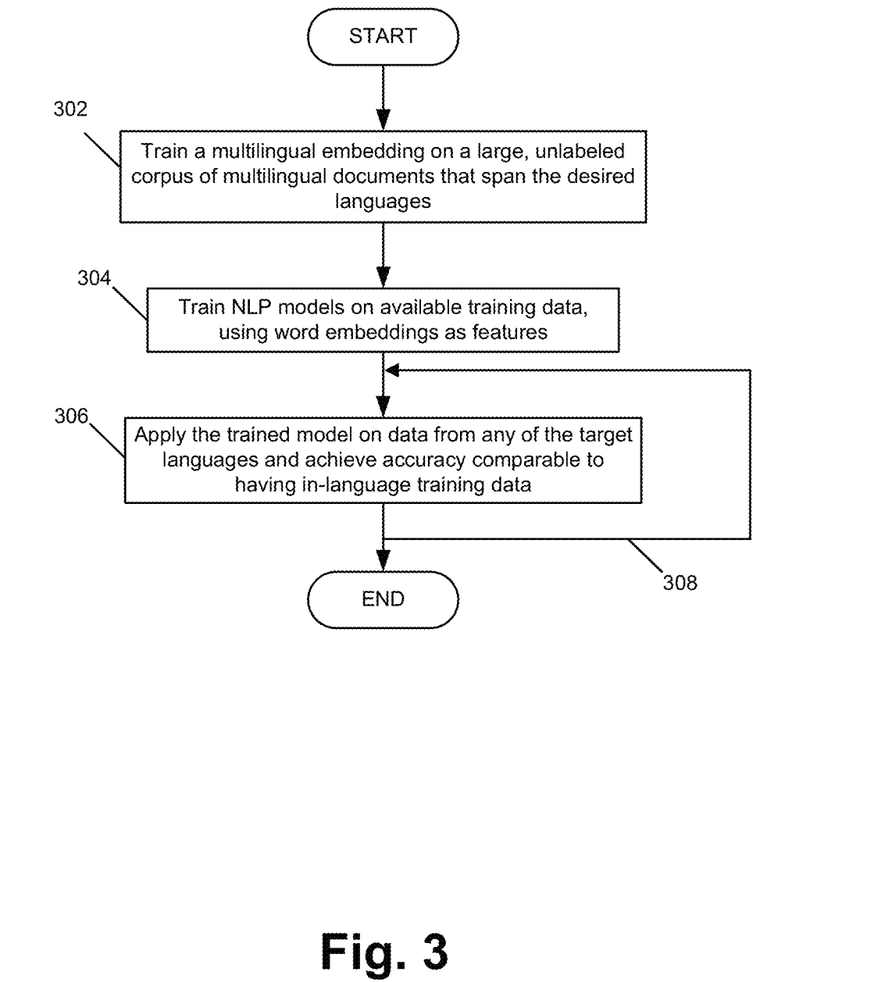
FIG. 3 illustrates a flow diagram of the functionality of training a multilingual embedding for performing NLP tasks, in accordance with an embodiment of the invention.
Figure 4:
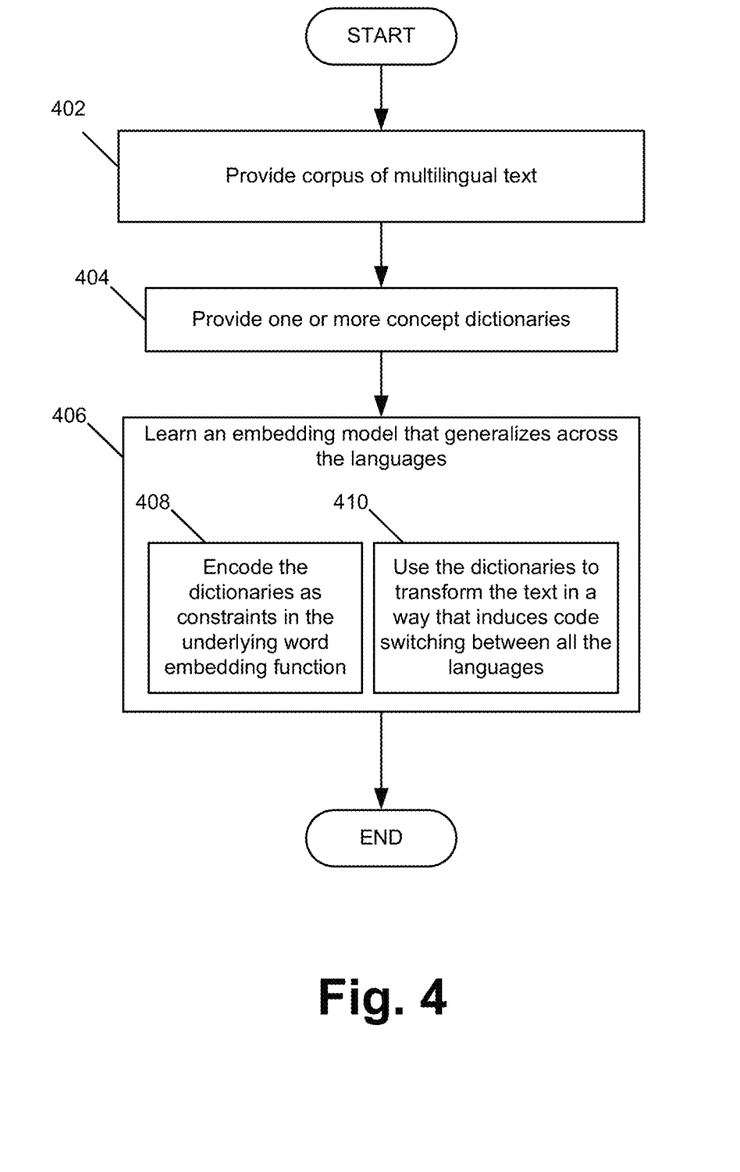
FIG. 4 illustrates a flow diagram of the functionality of training a multilingual embedding that generalizes across languages, in accordance with an embodiment of the invention.
Figure 6:
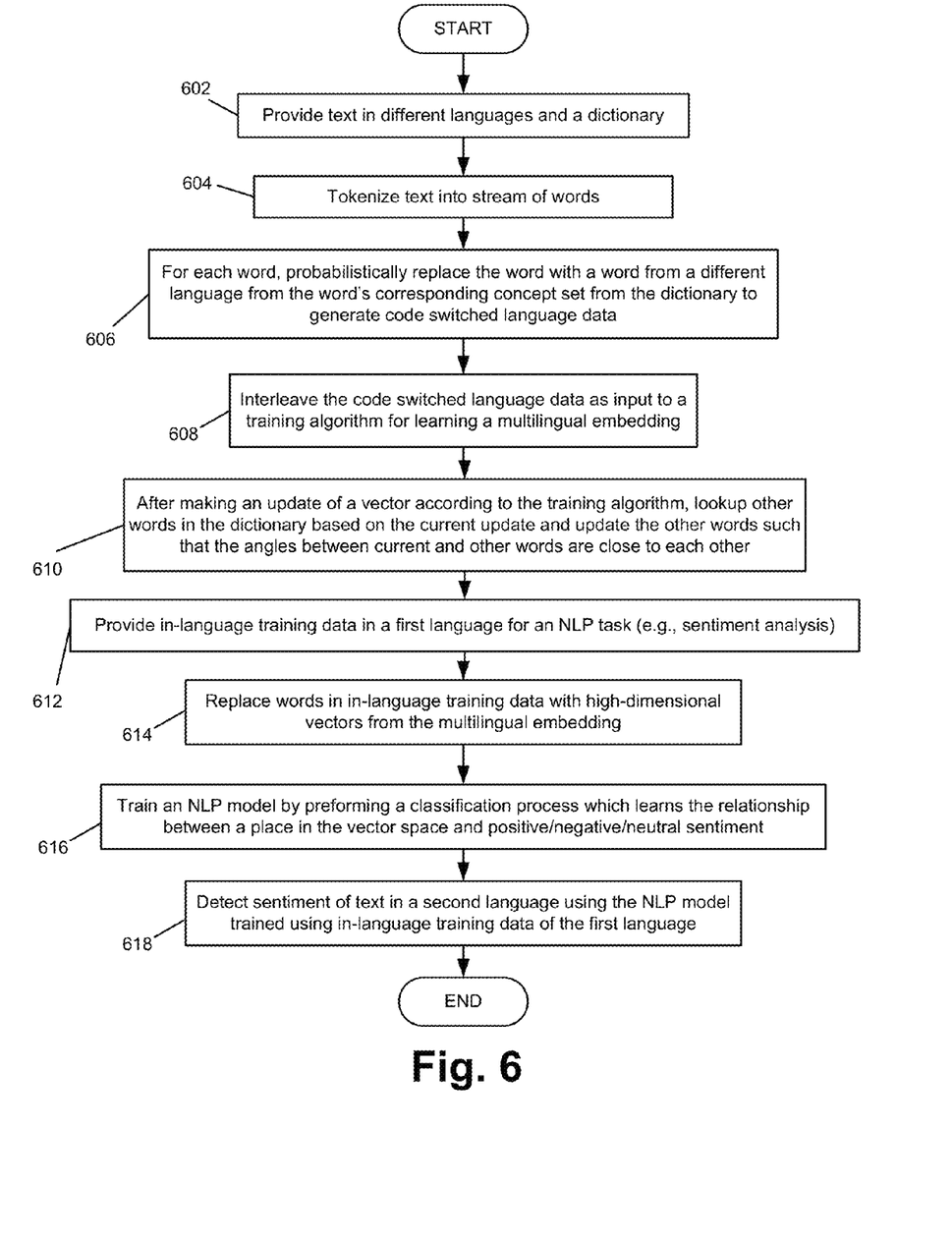
FIG. 6 illustrates a flow diagram of the functionality of training a multilingual embedding that generalizes across languages, in accordance with an embodiment of the invention.

FIG. 3 illustrates a flow diagram of the functionality of training a multilingual embedding for performing NLP tasks, in accordance with an embodiment of the invention. In one embodiment, the functionality of the flow diagram of FIG. 3, and the functionality of the flow/block diagrams of FIGS. 4 and 6, are each implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 302, a multilingual embedding is trained on a large, unlabeled corpus of multilingual documents that span the desired languages. The multilingual embedding can be trained as described, for example, by FIG. 4 discussed below. The multilingual embedding can be generalized across languages by modifying input training data (e.g., via artificial code switching) and/or modification of the training algorithm step (e.g., by transforming multilingual dictionaries into constraints in the underlying optimization problem).

At 304, an NLP model is trained on all available training data, using word embeddings as features.

At 306, the trained model is applied on data from any of the target languages to achieve accuracy comparable to having in-language training data.

FIG. 4 illustrates a flow diagram of the functionality of training a multilingual embedding that generalizes across languages, in accordance with an embodiment of the invention. It has been shown that models such as continuous bag-of-words ("CBOW") capture a large amount of the syntactic/semantic structure of a language. Embodiments extend these models so as to generalize such structure across multiple languages using one or both of two approaches: augmenting the objective function with multilingual constraints, and/or transforming the input data to produce multilingual contexts.

For the purposes of FIG. 4, assume there are M languages $L_m$ with corresponding vocabularies $V_m$, then $V = \cup_{m=1}^{M} V_m$ is the vocabulary of all the languages.

At 402, a large corpus of multilingual text $\mathcal{D}$ can be provided with documents $D_i \in \mathcal{D}$ comprised of word sequences $w_1, \ldots, w_{n_i}$ where each $w_j \in V$. For example, the large corpus can comprise a large number of documents from websites such as Wikipedia (http://www.wikipedia.com), blogs, newswire, Twitter (http://www.twitter.com), and other social media that contain documents in multiple languages.

At 404, a small set of human-provided concept dictionaries $\mathcal{C}$ can be provided that link words across languages. A concept dictionary $\mathcal{C}$ is a set of concepts where each concept $C_i \in \mathcal{C}$ is a set of words that all have similar meaning (e.g., a concept set containing "red", "rouge" and "rojo"). Note that the language for any given word or document is not necessarily known.

At 406, an embedding model $\mathcal{M} : V \rightarrow \mathcal{R}^k$ is learned that maps each word type to a k-dimensional vector such that the vectors capture syntactic and semantic relations between words in a way that generalizes across the languages.

Embodiments generate a solution space that is modular in the sense that the multilingual approaches are compatible with many underlying (monolingual) embedding methods. In this way, it is easy to implement the techniques on top of existing embedding implementations such as Latent Semantic Analysis ("LSA"), Restricted Boltzmann Machines ("RBMs"), CBOW, skip-grams (or "SkipGram"), Global Vectors for Word Representation ("GloVe"), or Latent Dirichlet Allocation ("LDA").

Regarding the area of word embeddings, let W be the weights of some underlying embedding model, usually consisting of a matrix in which each row is a word vector. Suppose the underlying embedding model is trained using the following objective function ("Equation 1"):

$$\mathcal{M} = \text{argmax}_W f(\mathcal{D}; W) \qquad (1)$$

For example, the SkipGram/CBOW objective function, with negative sampling, is approximately: $f(\mathcal{D}; W) = \Sigma_{(w,c) \in \mathcal{D}} \sigma(w_x^T V_c) - \Sigma_{(w,c) \in \tilde{\mathcal{D}}} \sigma(W_w^T V_c)$ where $$\sigma(x) = \frac{1}{1 + e^{-x}}$$

is the sigmoid function, $\tilde{\mathcal{D}}$ is the negative dataset and V is the output weights. In SkipGram the context is a single word, whereas in CBOW it is the average vector over the context window.

Embodiments can perform one or both of two approaches 408/410 of FIG. 4 when learning multilingual embeddings at 406.

At 408, the dictionaries are directly encoded as constraints in the underlying word embedding objective function. There are many possible ways to impose concept-based constraints on the underlying model. Two possibilities are as follows.

Given an objective function as described above in Equation 1, constraint-based multilingual embeddings can be modelled as follows ("Equation 2"):

$$f'(\mathcal{D}, \mathcal{C}; W) = f(\mathcal{D}; W) + g(\mathcal{C}; W) \qquad (2)$$

Where $g(\mathcal{C}; W)$ encourages the satisfaction of the cross-lingual constraints. The challenge is developing a function g that both respects the data and structure of the language while also encouraging common structure to be shared between words in different languages that have similar meanings.

For example, $g(\mathcal{C}; W)$ can be set to increase the probability of a word being in its concept sets. With this function word vectors would be learned that jointly predict their context and also predict the concept sets to which they belong as follows ("Equation 3"):

$$g(\mathcal{C}; W) = \Sigma_{w \in \mathcal{D}} \Sigma_{c \in \mathcal{C}(w)} p(w \in c; W) \qquad (3)$$

Where $\mathcal{C}(w) = \{c | c \in \mathcal{C} \wedge w \in c\}$ are concepts containing w and $p(w \in C; W) = \sigma(W_w^T W_c)$ is the probability of a word belonging to a concept.

However, the number of constraints imposed by the data may be far greater than the number of constraints imposed by the concept sets. Additionally, the amount of data imposed constraints varies substantially with the frequency of the words. Thus, appropriately balancing g and $f$ is challenging. An alternative is to use a more aggressive form of g where the pairwise angles of words in each concept set are constrained to be as small as possible ("Equation 4"):

$$g(\mathcal{C}; W) = -\sum_{c \in \mathcal{C}} \sum_{w_i \neq w_j \in c} \sigma(\cos(W_i, W_j)) \quad (4)$$

Note that unlike the sigmoid of the dot product, the sigmoid of the cosine similarity will not decay to zero as the model learns the constraints. This makes the cosine based constraint more aggressive because the gradients remain large. In order to keep the weights from diverging, each update can be further regularized so that the norm of a word's weight vector after an update for Equation 4 does not cause the norm to exceed its current value. That is, suppose $a_i = \|W_i\|_2$ is the l2 norm before the update and $b_i = \|W_i + \nabla\|_2$ is the norm after the update. Then, after each concept-based update to $W_i$, regularize by $W_i = \min(1, a/b) \times W_i$.

At 410, the dictionaries are used to transform the data in a way that induces code switching between all the languages. Code-switching is the process in which a speaker of multiple languages switches between those languages in discourse. Code-switching overlaps the meaning between two (or more) languages, and so the distributional representation of a word in one language is linked to context words from another language. Thus the result of code-switching provides rich multilingual context for training window based word embeddings.

Unfortunately, in written text, code-switching is an infrequent event. Thus, one approach would be to use a classifier to identify instances of code-switching and treat such contexts in a special way (e.g., by giving higher weight to the updates from the code-switched data). However, the problem of language identification is non-trivial. Also it is not clear that sufficient natural code-switching occurs in large datasets such as Wikipedia.

Instead, the dictionaries can be used to artificially induce extra code-switching in the input data. This process, termed Artificial Code-Switching ("ACS"), fills in unobserved cells in the word to context-word co-occurrence matrix, as shown, for example, in FIG. 2 and discussed above. This extra knowledge is analogous to having extra recommendations in a recommender system (i.e., recommendations that a word in one language could be substituted for a word in another language). One question is how to fill the cells of this matrix in a way that most naturally causes the learning of shared structure in the multilingual space. Ideally, in order to respect the distributional hypothesis, it is desirable for the co-occurrence statistics between words of different languages to resemble the co-occurrence statistics of words within a language. One way of accomplishing this is to fill in the matrix by randomly replacing a word in one language with its translation in another. In this way, co-occurrence "mass" from the monolingual blocks is shared across languages.

Specifically, a new code-switched corpus $\mathcal{D}'$ can be generated by transforming each word $w_i \in \mathcal{D}$ with the following process. First, a variable is drawn, $s \sim \text{Bernoulli}(\alpha)$. If $s=\text{true}$ then code-switch and sample a new word $w'_i$. To generate $w'_i$, sample a concept c from $C(w_i)$ then sample a word $w'_i$ from c. If $s=\text{false}$ then do not code switch.

Figure 5:
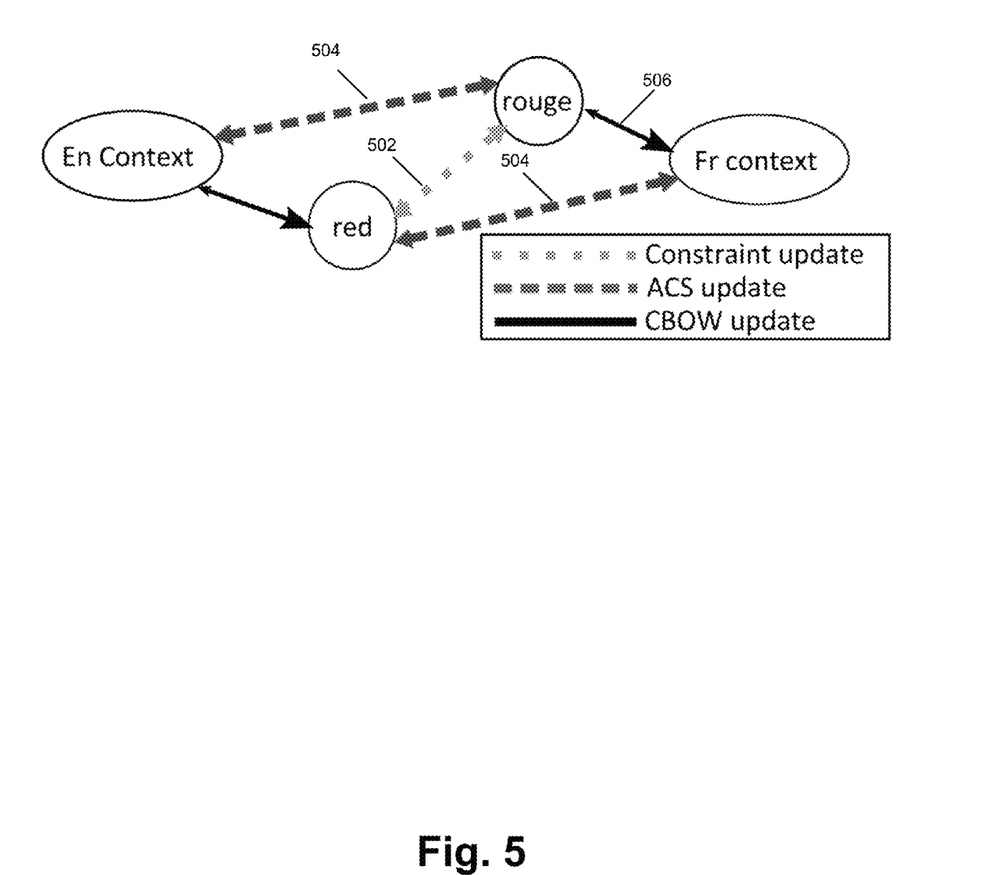
FIG. 5 illustrates different updates on word-context pairs, in accordance with an embodiment of the invention.

FIG. 5 illustrates different updates on word-context pairs, in accordance with an embodiment of the invention. FIG. 5 shows different kinds of updates that can be performed on a multilingual set of words and contexts. Constraint updates discussed above at 408 of FIG. 4 are illustrated as a dotted line 502, representing the constraints pulling the vectors for "rouge" and "red" closer together. As these two words are pulled together the context words also move closer. The CBOW update is shown as an unbroken black arrow 506. The update performed by CBOW moves the context closer to the word, and the word closer to the context. The code-switching update 504 moves the English word "red" closer to the French context for the word "rouge" and vice versa. This does not directly affect the relationship between "red" and "rouge" but over repeated updates it enforces a relaxed form of the constraint update.

FIG. 6 illustrates a flow diagram of the functionality of training a multilingual embedding that generalizes across languages, in accordance with an embodiment of the invention.

At 602, text in different languages and a dictionary are provided.

At 604, the text is tokenized into stream of words.

At 606, for each word, probabilistically replace the word with a word from a different language from the word's corresponding concept set from the dictionary to generate code switched language data.

At 608, the code switched language data is interleaved as input to a training algorithm for learning a multilingual embedding. For example, a line of text from an English document can be provided as input to the training algorithm followed by a line of text from a French document.

At 610, after making an update of a vector according to the training algorithm, a lookup for other words is performed in the dictionary based on the current update and the other words are updated such that the angles between the current and the other words are close to each other. For example, constraints can be used to force the current and other dictionary words to have similar magnitudes and angles between them.

At 612, in-language training data is provided in a first language for an NLP task (e.g., sentiment analysis).

At 614, words in the in-language training data are replaced with high-dimensional vectors from the multilingual embedding.

At 616, an NLP model is trained by preforming a classification process which learns the relationship between a place in the vector space and positive/negative/neutral sentiment.

At 618, sentiment of text in a second language is detected using the NLP model trained using in-language training data of the first language.

It will be appreciated that one or both of 606 (artificial code switching) and 610 (dictionary constraints) can be performed.

Figure 7:
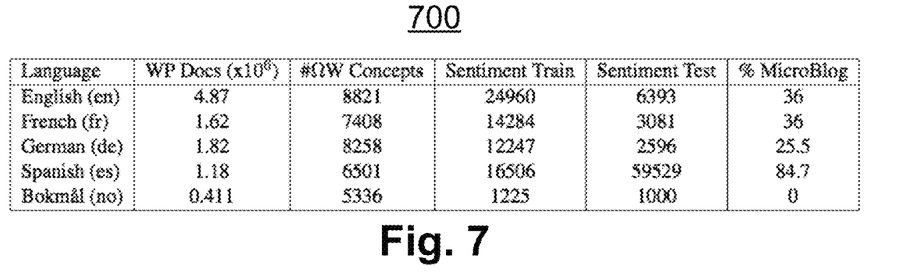
FIG. 7 is a table illustrating experimental data, in accordance with an embodiment of the invention.

FIG. 7 is a table 700 illustrating experimental data, in accordance with an embodiment of the invention. The experiments are used to assess the quality and practicality of the multilingual embedding spaces. The first set of experiments measures the former, and the second set measure the latter on the task of sentiment analysis. Five languages were selected to represent various levels of resource-availability, as reflected by the number of Wikipedia pages. English has almost five million pages in Wikipedia, French, German and Spanish each have over a million, whereas, Bokmål has over 100,000 articles. Table 700 includes a list of the languages. Languages with even fewer Wikipedia pages were considered, but a large proportion of the pages were found to be stubs, and hence less useful.

Each system employs CBOW as the underlying model $f$. The multilingual embedding models also employ a set of human provided concept dictionaries $\mathcal{C}$ that translate words with similar meaning from one language to another. Such dictionaries are readily available, and for the purpose of these experiments OmegaWiki was used, a community based effort to provide definitions and translations for every language in the world. Systems include:

Monolingual—A baseline system in which separate embeddings are trained for each language on monolingual data with CBOW.

CBOW No constraints (no const)—A baseline system in which we train CBOW on a multilingual corpus.

CBOW With constraints (with const)—The method described by setting g to Equation 4. After each CBOW update, updates are performed to satisfy g on words in the context for which there is a constraint.

Artificial code switching (ACS)—The artificial code switching approach described above in which the concept sets in OmegaWiki are used to perform the word substitutions. The parameter $\alpha=0.25$. ($\alpha=0.25$ is an initial guess for the parameter based; it was found on development data that the method is robust to the setting of $\alpha$.)

The data in experiments comprises interleaved documents from the various mono-lingual Wikipedias: bilingual experiments involve Wikipedia documents in two languages, and multilingual experiments use Wikipedia documents from all five languages. In all experiments, the same CBOW parameters are used (two iterations, 300 dimensions, initial learning rate 0.05, filter words occurring fewer than 10 times).

Figure 8:
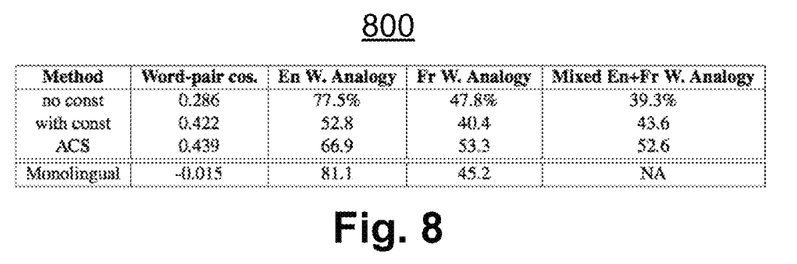
FIG. 8 is a table comparing different multilingual embeddings, in accordance with an embodiment of the invention.

FIG. 8 is a table 800 comparing different multilingual embeddings, in accordance with an embodiment of the invention. In this experiment the quality of the joint multilingual embedding space is evaluated. Two aspects of the spaces have been assessed. First, the amount of structure shared across languages. Second, as the number of languages increases in the shared space, how does the quality of the individual language's representation change in this space.

For the latter aspect, the accuracy of multilingual embeddings on the word analogy task can be examined. An example analogy question is man:king::woman:?. The embedding makes a prediction via king−man+woman and if (and only if) queen is one of the top five most similar words to the resulting vector then the model is credited with getting the analogy correct. The original dataset contains analogies in English, but they were translated into French.

For evaluating the former aspect, first, a mixed bilingual (En+Fr) analogy tasks by mixing words from the monolingual analogies, e.g., homme:roi::woman:queen. Second, the OmegaWiki are split concepts into 50/50 training/testing sets. The embedding models can be trained using half the concepts, and other half can be used for evaluating the quality of the embedding (via the average cosine similarity of words that appear in the same concept).

The evaluations are presented in Table 800. All models are trained on the combination of English, French, Spanish, German, and Bokmål, but the monolingual models are trained on each language independently. First, observe that CBOW alone (with no constraints) learns a considerable amount of cross-lingual word similarity (0.285 cosine similarity). This is likely due to the phenomena mentioned in the introduction (e.g., lexical borrowing), and is notable because multilingual word-vectors from independently trained embeddings should be orthogonal (as verified by last row of the table). Both multilingual embedding techniques substantially improve the cosine similarity over multilingual CBOW, with ACS achieving the most improvement. Furthermore, ACS performs substantially better on the mixed (En+Fr) word analogies than the other systems. The results indicate that ACS learns common multilingual structure.

Accuracy on English and French monolingual word analogies was also measured. On English, a high resource language, the multilingual information may hurt performance. However, for French—which has an order of magnitude fewer tokens than English—the multilingual information improves the quality of the embedding, especially for ACS which again, performs best. The shared structure allows a low resource language to benefit from a high resource language (though at some cost to the high resource language).

Together, these results provide some evidence that a substantial amount of structure is shared across languages, and that artificial code switching is able to capture such structure. One reason ACS is so effective is that it is able to overrule concept-based constraints when they contradict meaning derived naturally from the data.

Figure 9:
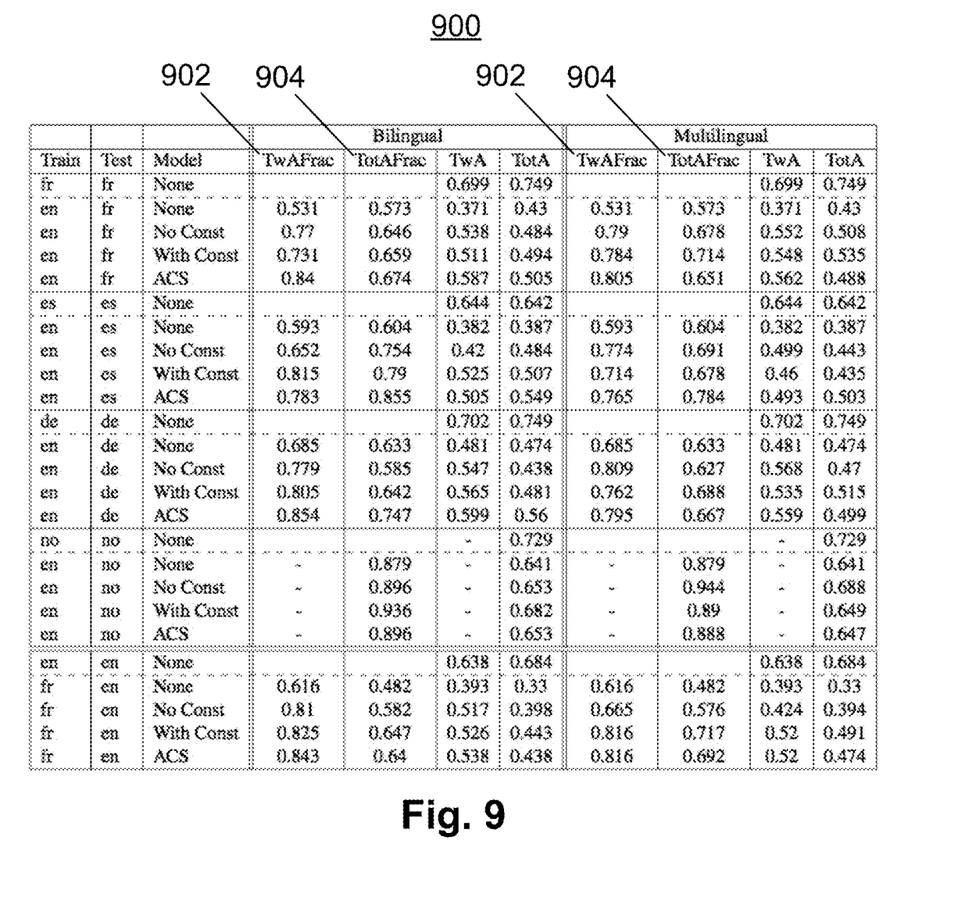
FIG. 9 is a table illustrating sentiment analysis results, in accordance with an embodiment of the invention.

FIG. 9 is a table 900 illustrating sentiment analysis results, in accordance with an embodiment of the invention. This experiment tests if multilingual embeddings allow an NLP model to be trained on a high resource language (English), and then evaluate it on languages for which no training data exists. On document-level sentiment analysis, the task of classifying a document as expressing overall positive, negative or neutral sentiment was evaluated. Thus, the success of multilingual embeddings hinges upon whether the sentiment information captured in the word embedding dimensions generalizes across languages. Sentiment data was labelled (three classes) for the five languages: English, Spanish, French, German and Bokmål. The data comprises various sources such as product reviews, social media streams, and the micro-blogging site, Twitter.

In order to establish in-language baselines for the target languages, sentiment classifiers are trained on each of the target language's training data, using unigrams, bigrams, and bias, but no embeddings as features (termed "target language baselines"). The ultimate goal is to achieve accuracy similar to these systems, but without in-language training data. Cross-lingual baselines are established by training the lexical-based classifier on English. Additionally, cross-lingual models are trained on English using only multilingual (all five languages) word embeddings as features (i.e., no lexical and bias features) by averaging the normalized word vectors in each document. Finally, the cross-lingual embedding models are trained on French to evaluate English as a target language. Spanish, German and Bokmal were also trained on and the results were similar.

The results are presented in Table 900. The rows are grouped according to the test language, and in each group, the target language baseline is separated from the cross-lingual models via a dotted line. Accuracy is reported on both the complete data (columns prefixed with "To"), as well as the subset derived from Twitter (columns prefixed with "Tw"). The Twitter experiments use Twitter training data exclusively. In each of these languages (except Bokmål), the distribution of positive, negative and neutral class is well balanced, and hence comparable patterns are seen when evaluating with accuracy or F1. The fraction of accuracy achieved is also reported with respect to the target language baseline (columns suffixed with "AFrac"). In other words, this is asking, "what fraction of accuracy is obtained by using only source training data instead of target language training data."

The first two columns 902 and 904 in both bilingual and multilingual sections of the table represent fraction of the target language baseline accuracy for Twitter and complete datasets, respectively. In many cases, source-trained models achieve a high fraction of the accuracy of the "in target baseline" without using target training data. On Twitter data, the fraction is especially high, often over 80%. This is due to the fact that the short tweets have a high information content per word, and sentiment bearing words contribute more weight to embedding-dimension features.

As disclosed, embodiments can perform one or both of two methods for training multilingual word embedding models that integrate multiple languages into a shared vector space. These methods can operate using only a small dictionary of translated words to align the vector spaces, allowing useful inferences to be made across languages, based solely upon the vectors. The constraint approach introduces links between the words themselves, and the artificial code switching gives a softer link between a word and a context in a different language. Both of these approaches allow for generalizing a model trained on one language, and recover much of the test performance in another language. Embodiments can thereby learn a common representation across multiple languages so a model can be trained in a first language for which high resources are available (e.g., English) and then the model can be applied to all the other different languages without having to gather resources for those languages. An embedding model can contain more than two languages, and that these multilingual models can outperform bilingual models.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to manage natural language processing (NLP) model training, the managing comprising:
   providing an unlabeled corpus of multilingual documents that span a plurality of target languages;
   training a multilingual embedding on the corpus of multilingual documents as input training data, the multilingual embedding being generalized across the target languages by modifying the input training data and/or transforming multilingual dictionaries into constraints in an underlying optimization problem;
   training an NLP model on training data for a first language of the target languages, using word embeddings of the trained multilingual embedding as features; and
   applying the trained NLP model on data from a second of the target languages, the first and second languages being different.

2. The computer readable medium of claim 1, the multilingual embedding being generalized across the target languages by modifying the input training data.

3. The computer readable medium of claim 1, the multilingual embedding being generalized across the target languages by transforming multilingual dictionaries into constraints in an underlying optimization problem.

4. The computer readable medium of claim 2, wherein modifying the input training data comprises artificial code switching.

5. The computer readable medium of claim 4, wherein artificial code switching comprises: for each word of the input training data, probabilistically replace the word with a word from a different language from the word's corresponding concept set from a dictionary.

6. The computer readable medium of claim 3, wherein the training a multilingual embedding comprises making a first update of a first vector, and the transforming multilingual dictionaries into constraints in the underlying optimization problem comprises: after making the first update of the first vector, looking up other words in the multilingual dictionaries based on the first update and updating respective other vectors of the other words such that angles between the first vector and the other vectors are close to each other.

7. The computer readable medium of claim 1, wherein the multilingual embedding is generalized across the target languages by modifying the input training data and modifying a step of a training algorithm transforming multilingual dictionaries into constraints in an underlying optimization problem.

8. A computer-implemented method for managing natural language processing (NLP) model training, the computer-implemented method comprising:
   providing an unlabeled corpus of multilingual documents that span a plurality of target languages;
   training a multilingual embedding on the corpus of multilingual documents as input training data, the multilingual embedding being generalized across the target languages by modifying the input training data and/or transforming multilingual dictionaries into constraints in an underlying optimization problem;
   training an NLP model on training data for a first language of the target languages, using word embeddings of the trained multilingual embedding as features; and
   applying the trained NLP model on data from a second of the target languages, the first and second languages being different.

9. The computer-implemented method of claim 8, the multilingual embedding being generalized across the target languages by modifying the input training data.

10. The computer-implemented method of claim 8, the multilingual embedding being generalized across the target languages by transforming multilingual dictionaries into constraints in an underlying optimization problem.

11. The computer-implemented method of claim 9, wherein modifying the input training data comprises artificial code switching.

12. The computer-implemented method of claim 11, wherein artificial code switching comprises: for each word of the input training data, probabilistically replace the word with a word from a different language from the word's corresponding concept set from a dictionary.

13. The computer-implemented method of claim 10, wherein the training a multilingual embedding comprises making a first update of a first vector, and the transforming multilingual dictionaries into constraints in the underlying optimization problem comprises: after making the first update of the first vector, looking up other words in the multilingual dictionaries based on the first update and updating respective other vectors of the other words such that angles between the first vector and the other vectors are close to each other.

14. The computer-implemented method of claim 8, wherein the multilingual embedding is generalized across the target languages by modifying the input training data and transforming multilingual dictionaries into constraints in an underlying optimization problem.

15. A system comprising:
   a memory device configured to store a natural language processing (NLP) management module;
   a processing device in communication with the memory device, the processing device configured to execute the NLP management module stored in the memory device to manage NLP model training, the managing comprising:

providing an unlabeled corpus of multilingual documents that span a plurality of target languages;

training a multilingual embedding on the corpus of multilingual documents as input training data, the multilingual embedding being generalized across the target languages by modifying the input training data and/or transforming multilingual dictionaries into constraints in an underlying optimization problem;

training an NLP model on training data for a first language of the target languages, using word embeddings of the trained multilingual embedding as features; and applying the trained NLP model on data from a second of the target languages, the first and second languages being different.

16. The system of claim 15, the multilingual embedding being generalized across the target languages by modifying the input training data.

17. The system of claim 15, the multilingual embedding being generalized across the target languages by transforming multilingual dictionaries into constraints in an underlying optimization problem.

18. The system of claim 16, wherein modifying the input training data comprises artificial code switching.

19. The system of claim 18, wherein artificial code switching comprises: for each word of the input training data, probabilistically replace the word with a word from a different language from the word's corresponding concept set from a dictionary.

20. The system of claim 17, wherein the training a multilingual embedding comprises making a first update of a first vector, and the transforming multilingual dictionaries into constraints in the underlying optimization problem comprises: after making the first update of the first vector, looking up other words in the multilingual dictionaries based on the first update and updating respective other vectors of the other words such that angles between the first vector and the other vectors are close to each other.

* * * * *

UNITED STATES PATENT AND TRADEMARK OFFICE
CERTIFICATE OF CORRECTION

PATENT NO. : 9,779,085 B2
APPLICATION NO. : 14/863996
DATED : October 3, 2017
INVENTOR(S) : Wick et al.

Page 1 of 1

It is certified that error appears in the above-identified patent and that said Letters Patent is hereby corrected as shown below:

On the Title Page

On page 2, Column 1, item [56], Line 8, delete "Wrod" and insert -- Word --, therefor.

In the Specification

Column 6, Line 59, delete " $\{c|c\epsilon\ C\ \wedge\ w\epsilon c\}$ " and insert -- $\{c|c\epsilon C\ \wedge\ w\epsilon c\}$ --, therefor.

Signed and Sealed this
Twenty-sixth Day of June, 2018

Andrei Iancu
*Director of the United States Patent and Trademark Office*